US012800050B2

(12) United States Patent
Yoshida et al.

(10) Patent No.: US 12,800,050 B2
(45) Date of Patent: Nov. 17, 2026

(54) MOTOR-OPERATED VALVE

(71) Applicant: FUJIKOKI CORPORATION, Tokyo (JP)

(72) Inventors: Tatsuya Yoshida, Tokyo (JP); Yusuke Arai, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 19/128,023

(22) PCT Filed: Nov. 21, 2023

(86) PCT No.: PCT/JP2023/041707
§ 371 (c)(1),
(2) Date: May 7, 2025

(87) PCT Pub. No.: WO2024/180829
PCT Pub. Date: Sep. 6, 2024

(65) Prior Publication Data

US 2026/0078834 A1 Mar. 19, 2026

(30) Foreign Application Priority Data

Mar. 2, 2023 (JP) ................................. 2023-032258

(51) Int. Cl.
*F16K 31/50* (2006.01)
*F16H 25/20* (2006.01)
(Continued)

(52) U.S. Cl.
CPC ............. *F16K 31/04* (2013.01); *F16H 25/20* (2013.01); *F16K 1/02* (2013.01); *F16K 27/029* (2013.01); *F16K 31/50* (2013.01); *F16K 31/53* (2013.01)

(58) Field of Classification Search
CPC .......... F16K 31/04; F16K 31/50; F16K 31/53; F16K 1/02; F16K 27/029; F16H 25/20
See application file for complete search history.

(56) References Cited

U.S. PATENT DOCUMENTS

| | | | |
|---|---|---|---|
| 10,975,984 B2 | 4/2021 | Uehara et al. | |
| 2008/0067464 A1 | 3/2008 | Arai et al. | |

(Continued)

FOREIGN PATENT DOCUMENTS

| | | |
|---|---|---|
| EP | 4303476 A1 | 1/2024 |
| JP | H04-114754 U | 10/1992 |

(Continued)

OTHER PUBLICATIONS

Jerpbak-Bayless Company; Guide to Multi-Start Threads (Year: 2021).*

(Continued)

*Primary Examiner* — Kelsey E Cary
(74) *Attorney, Agent, or Firm* — LUCAS & MERCANTI, LLP

(57) ABSTRACT

A motor-operated valve includes a driving shaft that has an external thread, a guide member that has an internal thread into which the external thread is screwed, and a planetary gear mechanism that reduces the rotational speed of a rotor and transmits rotation of the rotor to the driving shaft. Where L represents the lead of the external thread, and K represents the speed-reduction ratio of the planetary gear mechanism, the motor-operated valve 1 satisfies expressions [1] and [2] below:

$$0.04K \leq L \leq 0.10K \text{ and} \quad [1]$$

$$30 \leq K \leq 100. \quad [2]$$

9 Claims, 5 Drawing Sheets

(51) Int. Cl.

| | |
|---|---|
| ***F16K 1/02*** | (2006.01) |
| ***F16K 27/02*** | (2006.01) |
| ***F16K 31/04*** | (2006.01) |
| ***F16K 31/53*** | (2006.01) |

(56) References Cited

U.S. PATENT DOCUMENTS

2012/0068098 A1 3/2012 Arai
2022/0252312 A1 * 8/2022 Ogawa .................... F16K 31/04

FOREIGN PATENT DOCUMENTS

JP 2000-274544 A 10/2000
JP 2008-101765 A 5/2008
JP 2012-067835 A 4/2012
JP 2018-173102 A 11/2018
WO 2022/185824 A1 9/2022

OTHER PUBLICATIONS

International Preliminary Report on Patentability, dated Jul. 10, 2024, which was issued for the corresponding international application No. PCT/JP2023/041707, 6 pages, with English translation.
International Search Report, mailed on Feb. 20, 2024, issued for the International Application No. PCT/JP2023/041707, 6 pages, with English translation.
Written Opinion of the International Searching Authority, mailed on Feb. 20, 2024, issued for the International Application No. PCT/JP2023/041707, 7 pages, with English translation.
Office Action, dated Oct. 14, 2025, which was issued for the corresponding Japanese application No. 2023-032258, 4 pages, with English translation.
Notice of Reasons for Refusal, mailed Jul. 15, 2025, issued for the related Japanese patent application No. 2023-032258, with English translation, 7 pages.

* cited by examiner

MOTOR-OPERATED VALVE

CROSS REFERENCE TO RELATED APPLICATION

This Application is a 371 of PCT/JP2023/041707 filed on Nov. 21, 2023, which, in turn, claimed the priority of Japanese Patent Application No. 2023-032258 filed on Mar. 2, 2023, and both applications are incorporated herein by reference.

TECHNICAL FIELD

The present invention relates to a motor-operated valve.

BACKGROUND ART

Patent Literature 1 discloses an example of a motor-operated valve according to the related art. The motor-operated valve in Patent Literature 1 includes a valve body, a valve member, a driving shaft, a guide member, a gear mechanism, and a stepping motor. The valve body has a valve port. The valve member is pushed by a valve opening spring in a direction away from the valve port. The driving shaft has an external thread. The valve port, the valve member, and the driving shaft are arranged in a straight line. The guide member has an internal thread into which the external thread of the driving shaft is screwed. The stepping motor includes a rotor and a stator. The rotational speed of the rotor is reduced in the gear mechanism, and the rotation of the rotor is transmitted to the driving shaft. When the driving shaft rotates, the driving shaft moves in the axial direction by a screw-feed action.

When the rotor rotates in a first direction, the driving shaft pushes the valve member to move the valve member toward the valve port. When the rotor rotates in a second direction, the driving shaft moves away from the valve port, and the valve opening spring moves the valve member away from the valve port.

CITATION LIST

Patent Literature

Patent Literature 1: Japanese Unexamined Patent Application Publication No. 2018-173102

SUMMARY OF INVENTION

Technical Problem

For example, the motor-operated valve is used to control the flow rate of refrigerant in a refrigeration cycle system of an automotive air conditioner. The motor-operated valve may switch from a fully open state to a fully closed state or from a fully closed state to a fully open state, according to changes in operation modes of the air conditioner. The rotational speed of the rotor is reduced in the gear mechanism, resulting in a longer time required to switch the state of the motor-operated valve. Applying a lower speed-reduction ratio to the gear mechanism increases the moving speed of the valve member, reducing the time required to switch the state of the motor-operated valve. However, applying a lower speed-reduction ratio to the gear mechanism reduces the force exerted by the driving shaft to move the valve member. This limits the size of the valve port, reducing the Cv value of the motor-operated valve.

Accordingly, it is an object of the present invention to provide a motor-operated valve capable of ensuring a force necessary to move a valve member and having a short switching time to switch states of the motor-operated valve.

Solution to Problem

The inventors used multiple motor-operated valves, each with a unique combination of the speed-reduction ratio of a gear mechanism and the pitch of an external thread of a driving shaft, to diligently investigate the relationship between the time (switching time) to switch from a fully open state to a fully closed state and the force (axial force) exerted by the driving shaft to move a valve member.

In FIG. 5, line A1 schematically represents the relationship between the speed-reduction ratio, the switching time, and the axial force. The thickness of line A1 indicates the magnitude of the speed-reduction ratio, with a thicker line representing a greater ratio. In FIG. 5, line A2 schematically represents the relationship between the pitch, the switching time, and the axial force. The thickness of line A2 indicates the magnitude of the pitch, with a thicker line representing a greater pitch. The speed-reduction ratio and the pitch at an intersection of lines A1 and A2 correspond to the speed-reduction ratio and the pitch in a reference motor-operated valve.

Line A1 represents the relationship between the switching time and the axial force in the reference motor-operated valve, where only the speed-reduction ratio varies while the pitch remains unchanged. The greater the speed-reduction ratio, the longer the switching time and the greater the axial force.

Line A2 represents the relationship between the switching time and the axial force in the reference motor-operated valve, where only the pitch varies while the speed-reduction ratio remains unchanged. The greater the pitch, the shorter the switching time and the smaller the axial force.

In FIG. 5, line A3 represents the relationship between the switching time and the axial force in the reference motor-operated valve, where the number of threads of the external thread varies while the speed-reduction ratio and the pitch remain unchanged. The greater the number of the threads, the shorter the switching time and the smaller the axial force. Where n represents the number of the threads of the external thread, the lead of the external thread is equal to the pitch multiplied by n.

The inventors investigated the switching time and the axial force using multiple combinations of the speed-reduction ratio and the lead, finding the relationship between the speed-reduction ratio and the lead that enables both an appropriate switching time and an appropriate axial force. Based on the findings, the present invention has been achieved.

To achieve the object described above, a motor-operated valve according to the present invention includes a valve body that has a valve port, a valve member that faces the valve port, a motor that includes a rotor, a driving shaft that has an external thread, a guide member that has an internal thread into which the external thread is screwed, and a gear mechanism that reduces rotational speed of the rotor and transmits rotation of the rotor to the driving shaft. When the driving shaft rotates, the driving shaft moves toward or away from the valve port to move the valve member with respect to the valve port. Where L represents a lead of the external thread, and K represents a speed-reduction ratio of the gear mechanism, expressions (1) and (2) below are satisfied:

$$0.04K \le L \le 0.10K \quad (1)$$

$$30 \le K \le 100. \quad (2)$$

In the present invention, preferably, where d represents a major diameter of the external thread, d1 represents a minor diameter of the external thread, and p represents a pitch of the external thread, expressions (3) and (4) below are satisfied:

$$p \le \{4 \times (2 \times d - 5)\}/(5 \times \sqrt{3}) \text{ for } d \le 35/8 \quad (3)$$

$$p \le (24 \times d)/(35 \times \sqrt{3}) \text{ for } d \ge 35/8. \quad (4)$$

In the present invention, preferably, the external thread and the internal thread are each a multi-start thread.

Advantageous Effects of Invention

According to the present invention, where L represents the lead of the external thread of the driving shaft, and K represents the speed-reduction ratio of the gear mechanism, the motor-operated valve satisfies expressions (1) and (2) above. With this configuration, the motor-operated valve can achieve a shorter switching time to switch states of the motor-operated valve while ensuring a force necessary to move the valve member.

DESCRIPTION OF EMBODIMENTS

A motor-operated valve according to an embodiment of the present invention is described below with reference to FIGS. 1 to 4. The motor-operated valve according to the embodiment is used to control the flow rate of refrigerant in a refrigeration cycle system of an automotive air conditioner.

Figure 1:
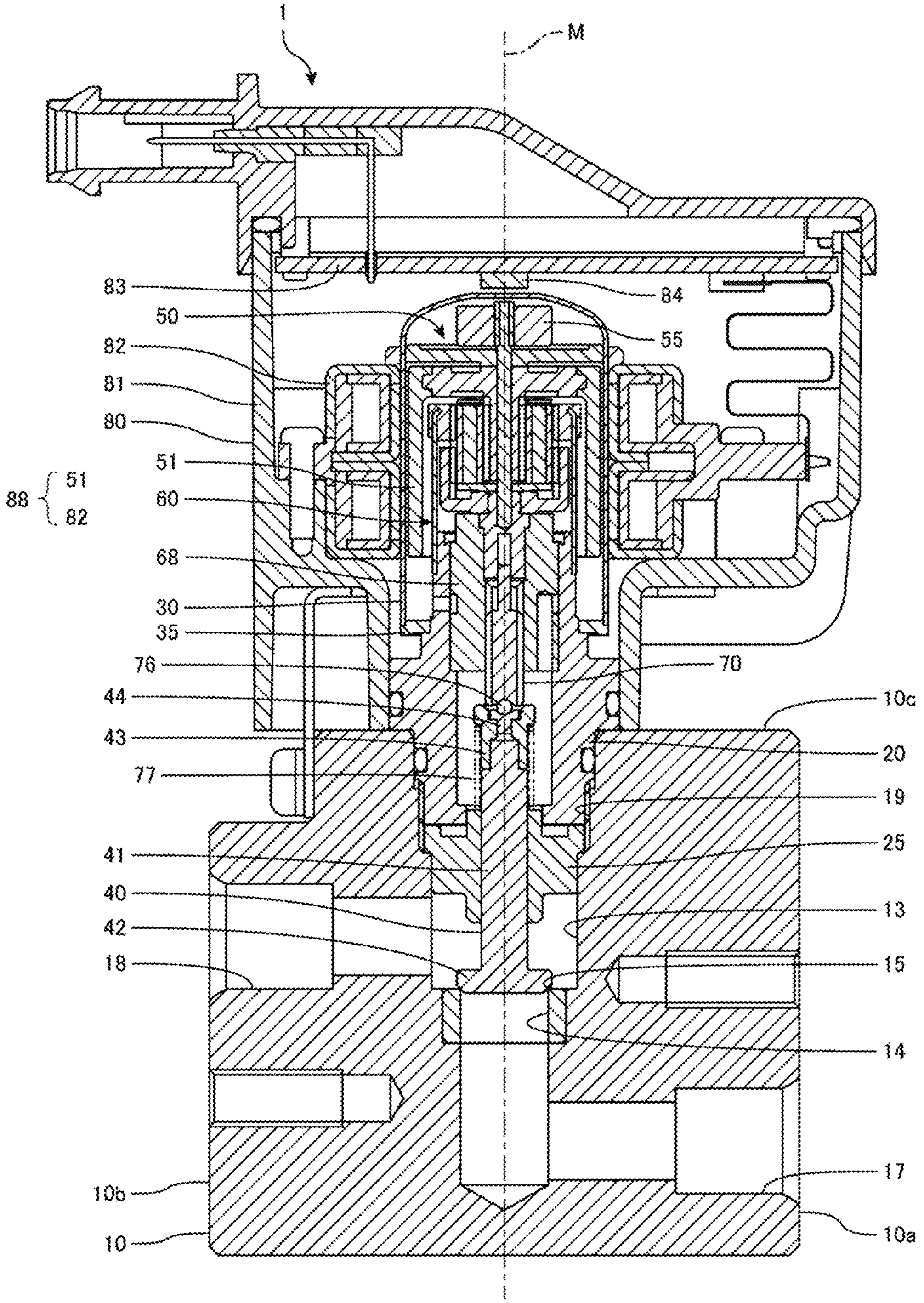
FIG. 1 is a sectional view of a motor-operated valve according to an embodiment of the present invention.
Figure 2:
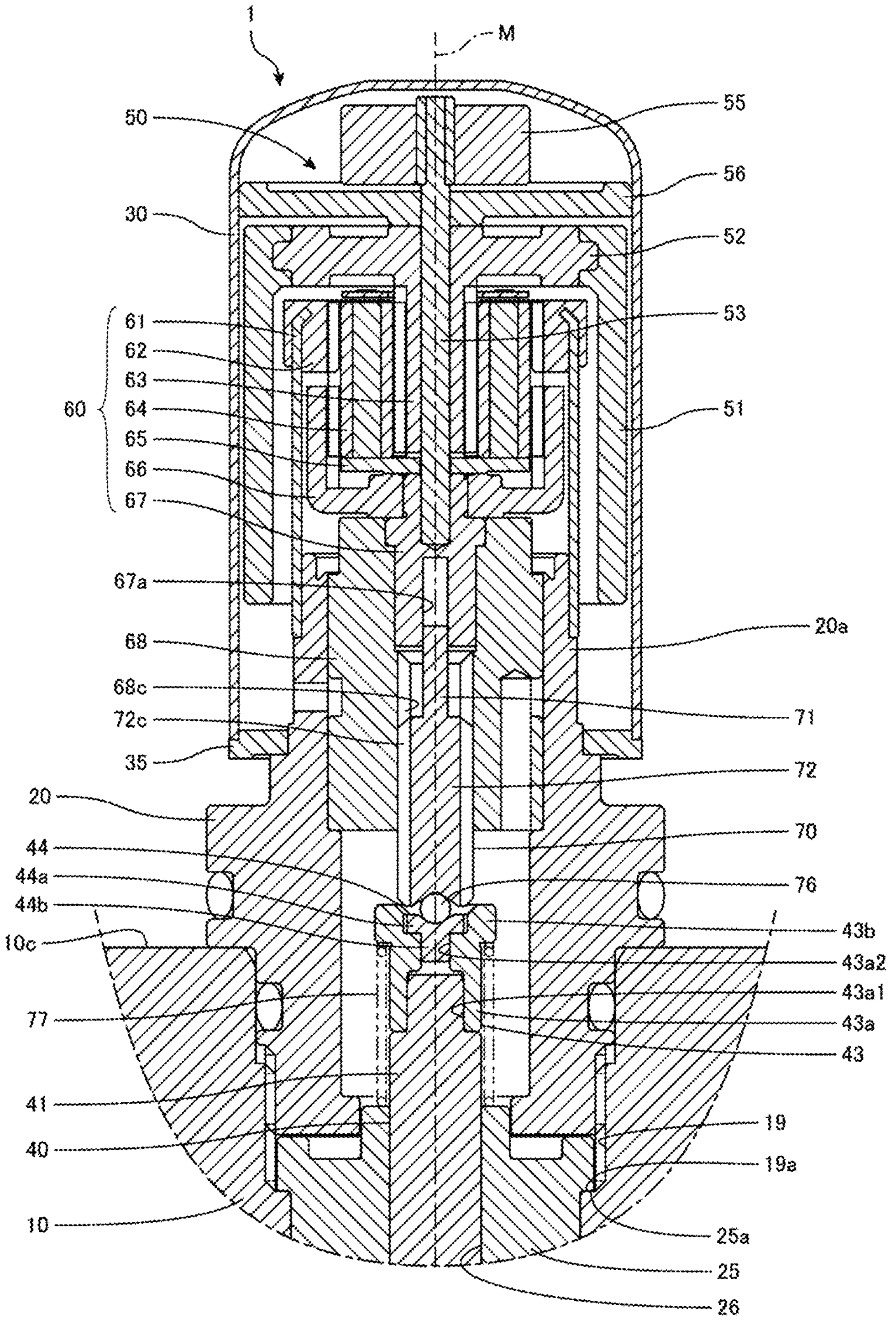
FIG. 2 is an enlarged sectional view of a part of the motor-operated valve.
Figure 3:
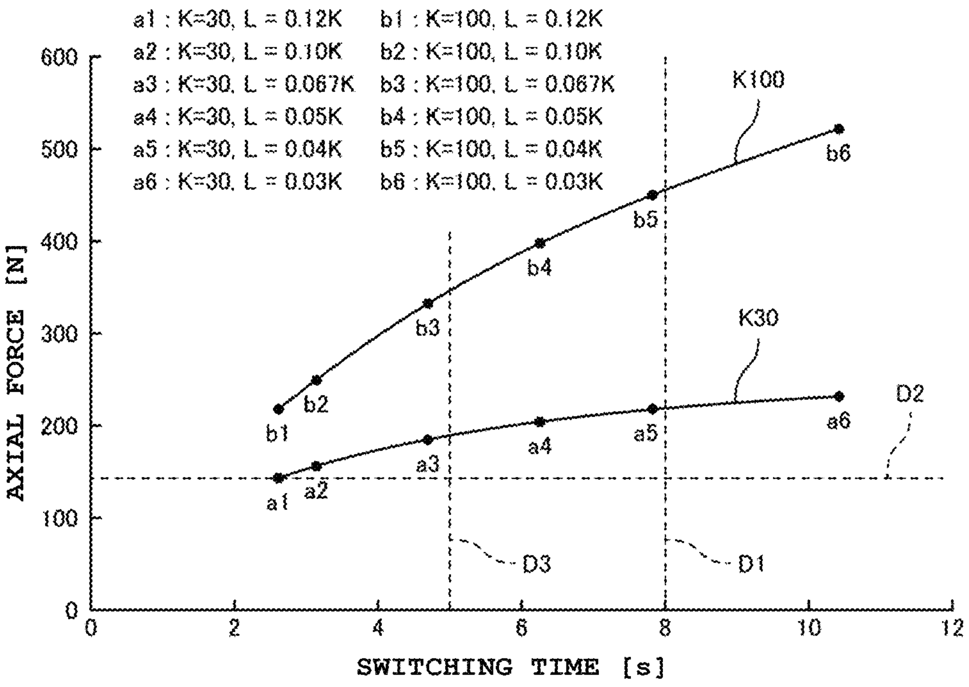
FIG. 3 is a graph representing the relationship between the time (switching time) for the motor-operated valve to switch states and the force (axial force) exerted by a driving shaft of the motor-operated valve to move a valve member.
Figure 4:
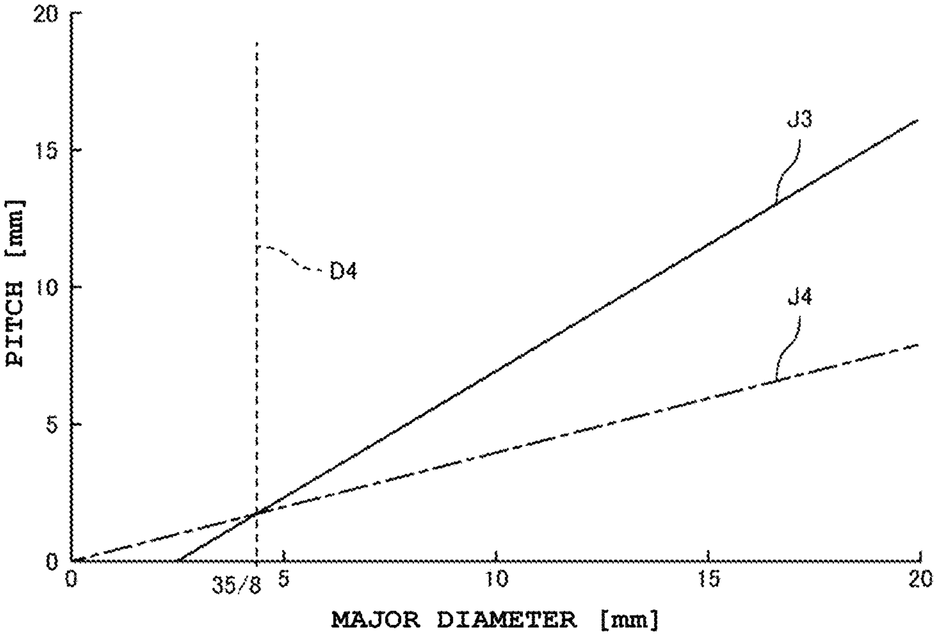
FIG. 4 is a graph representing the relationship between a major diameter of the driving shaft and a pitch of the driving shaft.
Figure 5:
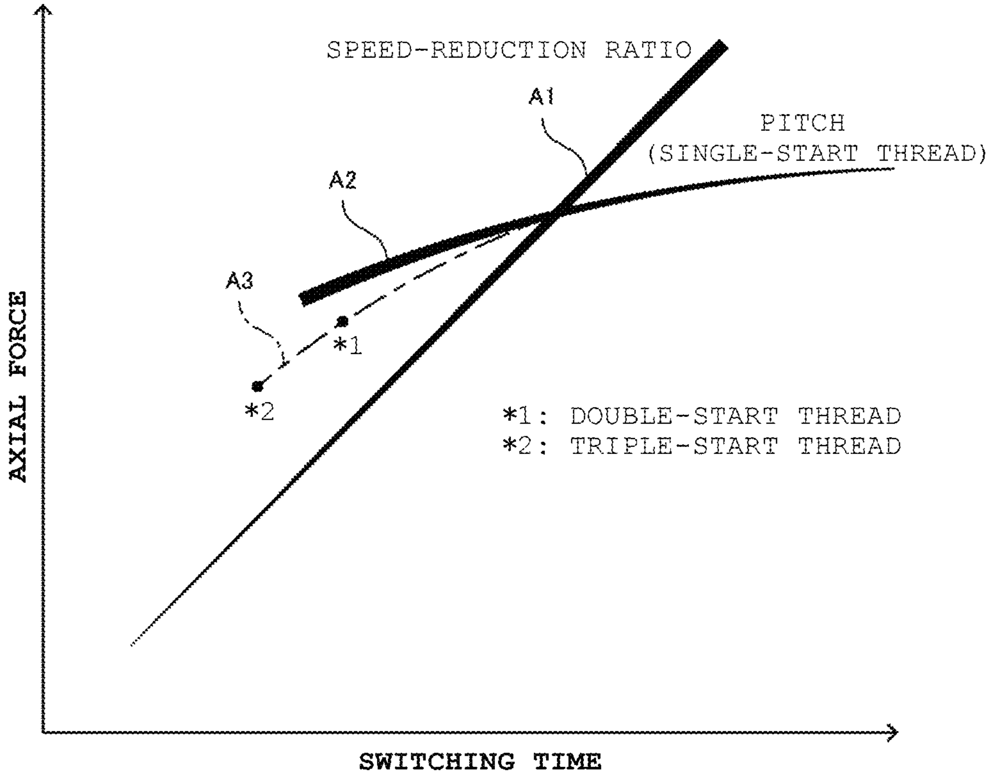
FIG. 5 is a diagram schematically illustrating the relationship between a speed-reduction ratio of a gear mechanism, the switching time, and the axial force and the relationship between the pitch of an external thread of the driving shaft, the switching time, and the axial force.

FIG. 1 is a sectional view of the motor-operated valve according to the embodiment of the present invention. FIG. 2 is an enlarged sectional view of a part of the motor-operated valve, the part primarily consisting of a valve member and a driving mechanism. In FIG. 2, the illustration of a stator unit is omitted. FIG. 3 is a graph representing the relationship between the time (switching time) for the motor-operated valve to switch states and the force (axial force) exerted by a driving shaft of the motor-operated valve to move the valve member. FIG. 4 is a graph representing the relationship between a major diameter of the driving shaft and a pitch of the driving shaft.

As illustrated in FIGS. 1 and 2, a motor-operated valve 1 according to the embodiment includes a valve body 10, a holder 20, a valve-member supporting member 25, a can 30, a valve member 40, a driving mechanism 50, and a stator unit 80.

The valve body 10 has a rectangular parallelepiped shape. The valve body 10 has a valve chamber 13 and a valve port 14 connected to the valve chamber 13. In the valve chamber 13, the valve port 14 is enclosed by a valve seat 15. The valve body 10 has a first passage 17 and a second passage 18. The first passage 17 extends from a right surface 10*a* of the valve body 10 to the valve port 14. The first passage 17 is connected to the valve chamber 13 through the valve port 14. The second passage 18 extends from a left surface 10*b* of the valve body 10 to the valve chamber 13. The valve body 10 has a mounting hole 19. The mounting hole 19 is provided in an upper surface 10*c* of the valve body 10. An internal thread is provided on the inner circumferential surface of the mounting hole 19. The mounting hole 19 is connected to the valve chamber 13. An annular flat surface 19*a* facing upward is provided in the part of the mounting hole 19 where the mounting hole 19 is connected to the valve chamber 13.

The holder 20 has a circular cylindrical shape. An external thread is provided on the lower part of the outer circumferential surface of the holder 20. The external thread of the holder 20 is screwed into the internal thread of the mounting hole 19 of the valve body 10. The holder 20 is mounted on the valve body 10 by a screw structure.

The valve-member supporting member 25 has a circular columnar shape. In the mounting hole 19, the valve-member supporting member 25 is disposed between the valve body 10 and the holder 20. The lower part of the valve-member supporting member 25 is press-fitted into the valve chamber 13. An annular flat surface 25*a* facing downward is provided in the outer circumferential surface of the valve-member supporting member 25. The annular flat surface 25*a* is in contact with the annular flat surface 19*a* of the valve body 10. The valve-member supporting member 25 has a supporting hole 26 extending in an up-and-down direction. The valve member 40 extends through the supporting hole 26. The valve-member supporting member 25 supports the valve member 40 to be movable in the up-and-down direction (a direction of an axis M).

The can 30 has a circular cylindrical shape. The can 30 is closed at the upper end and is open at the lower end. The lower end of the can 30 is bonded to the outer peripheral edge of a connection member 35 having a circular annular plate-like shape. An upper part 20*a* of the holder 20 is disposed in the connection member 35. The inner peripheral edge of the connection member 35 is bonded to the holder 20. The can 30 is secured to the valve body 10 via the connection member 35 and the holder 20.

The valve member 40 includes a stem 41, a valve portion 42, a spring receiving portion 43, and a ball receiving portion 44.

The stem 41 has a circular columnar shape. The stem 41 is disposed in the supporting hole 26 of the valve-member supporting member 25. The stem 41 is supported by the valve-member supporting member 25 and is movable in the up-and-down direction.

The valve portion 42 has a circular annular shape. The valve portion 42 is integrally formed with the stem 41 and is disposed at the lower end of the stem 41. The valve portion 42 projects radially outward from the outer circumferential surface of the stem 41. The valve portion 42 faces the valve port 14 in the up-and-down direction.

The spring receiving portion 43 includes a body 43*a* and a flange 43*b*. The body 43*a* has a circular columnar shape. The outer diameter of the body 43*a* is equal to the outer diameter of the stem 41. The body 43*a* has a first hole 43*a*1 and a second hole 43*a*2. The first hole 43*a*1 is provided in the lower end surface of the body 43*a*. The upper end of the stem 41 is disposed in the first hole 43*a*1. The body 43*a* is coaxially bonded to the stem 41. The second hole 43*a*2 is provided in the upper end surface of the body 43*a*. The flange 43*b* has a circular annular shape. The flange 43*b* is integrally formed with the body 43*a* and is disposed at the upper end of the body 43*a*. The flange 43*b* projects radially outward from the outer circumferential surface of the body 43*a*.

The ball receiving portion 44 includes a flat plate 44*a* having a circular shape and a projection 44*b* connected to the lower surface of the flat plate 44*a*. A recess having a conical shape is provided in the upper surface of the flat plate 44*a*. The projection 44*b* is fitted into the second hole 43*a*2 of the body 43*a* of the spring receiving portion 43. The projection 44*b* is secured to the body 43*a* of the spring receiving portion 43.

The valve member 40 changes the opening area of the valve port 14 in a stepless manner (including a substantially stepless manner) as the valve portion 42 moves toward and away from the valve port 14. The minimum value of the opening area of the valve port 14 is zero but can also be greater than zero. When the opening area of the valve port 14 is at the minimum value, the motor-operated valve 1 is in a fully closed state.

The driving mechanism 50 moves the valve member 40 in the up-and-down direction. The driving mechanism 50 includes a rotor 51, a permanent magnet 55, a magnetic shielding member 56, a planetary gear mechanism 60, a guide member 68, a driving shaft 70, a ball 76, and a valve opening spring 77.

The rotor 51 has a circular cylindrical shape. The outer diameter of the rotor 51 is smaller than the inner diameter of the can 30. The rotor 51 is rotatably disposed inside the can 30. A coupling plate 52 has a circular shape and is bonded to the upper end of the rotor 51. The coupling plate 52 closes the upper end of the rotor 51. A rotor shaft 53 extends through the center of the coupling plate 52. The rotor 51 is coupled to the rotor shaft 53 via the coupling plate 52. The rotor shaft 53 rotates together with the rotor 51.

The rotor 51 has a plurality of north (N) poles and a plurality of south(S) poles. The N poles and the S poles each extend in the up-and-down direction. The N poles and the S poles are disposed on the outer circumferential surface of the rotor 51 and are alternately arranged in the circumferential direction.

The permanent magnet 55 is disposed inside the can 30, above the rotor 51. The permanent magnet 55 has a disc shape. The permanent magnet 55 is secured to the upper end of the rotor shaft 53. The permanent magnet 55 is disposed coaxially with the rotor 51 and rotates together with the rotor 51.

The permanent magnet 55 has a north (N) pole and a south(S) pole. The permanent magnet 55 includes two parts divided by its diameter, with the N pole disposed in one of the two parts, and the S pole disposed in the other of the two parts.

The magnetic shielding member 56 has a disc shape. The magnetic shielding member 56 is disposed between the rotor 51 and the permanent magnet 55. The magnetic shielding member 56 is made of a soft magnetic material with a relatively high magnetic permeability, such as silicon steel. The magnetic shielding member 56 is secured to the rotor shaft 53. The magnetic shielding member 56 absorbs the magnetic flux generated by the rotor 51. The magnetic shielding member 56 inhibits the magnetic field generated by the permanent magnet 55 from being distorted by the magnetic field generated by the rotor 51.

The planetary gear mechanism 60 is of the 3K type. For example, the planetary gear mechanism 60 may be of the 2K-H type. The motor-operated valve 1 may employ, instead of the planetary gear mechanism 60, a gear mechanism serving as a reducer. The planetary gear mechanism 60 is disposed inside the rotor 51. The planetary gear mechanism 60 includes a gear case 61, a fixed ring gear 62, a sun gear 63, planetary gears 64, a carrier 65, an output gear 66, and an output shaft 67.

The gear case 61 has a circular cylindrical shape. The lower end of the gear case 61 is bonded coaxially to the upper part 20*a* of the holder 20. The fixed ring gear 62 is an internal gear. The fixed ring gear 62 is fixed to the upper end of the gear case 61.

The sun gear 63 is integrally formed with the coupling plate 52. The sun gear 63 is disposed on the lower surface of the coupling plate 52 and is coaxial with the coupling plate 52. The rotor shaft 53 extends through the sun gear 63. The sun gear 63 rotates together with the rotor 51 and the coupling plate 52.

The carrier 65 has a disc shape. The rotor shaft 53 extends through the center of the carrier 65. The carrier 65 can rotate about the rotor shaft 53, which serves as the rotational axis. The carrier 65 supports the planetary gears 64 to be rotatable. The planetary gears 64 are disposed between the fixed ring gear 62 and the sun gear 63.

The output gear 66 has a bottomed circular cylindrical shape. The output gear 66 is an internal gear. The planetary gears 64 are disposed between the output gear 66 and the sun gear 63. The output shaft 67 has a circular columnar shape. The upper part of the output shaft 67 is press-fitted into a hole provided in the bottom of the output gear 66. A slit 67*a* is provided in the lower part of the output shaft 67 and extends in the up-and-down direction. The output shaft 67 rotates together with the output gear 66.

The rotational speed of the sun gear 63 is reduced by the fixed ring gear 62, the planetary gears 64, the carrier 65, and the output gear 66, and the rotation of the sun gear 63 is transmitted to the output shaft 67. The planetary gear mechanism 60 serves as a reducer for reducing the rotational speed of the rotor 51. The speed-reduction ratio is defined as the angular velocity of the sun gear 63 divided by the angular velocity of the output shaft 67. The angular velocity of the sun gear 63 is equal to the angular velocity of the rotor 51.

The guide member 68 has a circular cylindrical shape. The guide member 68 is disposed inside the upper part 20*a* of the holder 20. The guide member 68 is secured with respect to the valve body 10 via the holder 20. The guide member 68 has an internal thread 68*c*. The internal thread 68*c* is provided on the lower part of the inner circumferential surface of the guide member 68. The output shaft 67 is disposed in the guide member 68. The guide member 68 supports the output shaft 67 to be rotatable.

The driving shaft 70 is formed, for example, by cutting a metal pole having a circular columnar shape. The driving shaft 70 includes a first portion 71 and a second portion 72.

The first portion 71 has a rectangular flat plate-like shape. The thickness of the first portion 71 is slightly smaller than the width of the slit 67*a* of the output shaft 67. The first portion 71 is disposed inside the slit 67*a* of the output shaft 67 and is movable in the up-and-down direction. The slit 67*a* and the first portion 71 enable the driving shaft 70 to move in the up-and-down direction relative to the output shaft 67 while transmitting the rotation of the output shaft 67 to the driving shaft 70.

The second portion 72 has a circular columnar shape. The second portion 72 is integrally formed with the first portion 71 and is connected to the lower end of the first portion 71. The second portion 72 has an external thread 72*c*. The external thread 72*c* is provided on the outer circumferential surface of the second portion 72. The external thread 72*c* is screwed into the internal thread 68*c* of the guide member 68. A recess having a conical shape is provided in the lower end surface of the second portion 72, and the ball 76 is bonded in the recess in the lower end surface of the second portion 72. The ball 76 is in contact with the recess in the flat plate 44*a* of the ball receiving portion 44 and is slidable relative to the recess in the flat plate 44*a*.

The internal thread 68*c* of the guide member 68 and the external thread 72*c* of the driving shaft 70 are each a single-start thread. The internal thread 68*c* and the external thread 72*c* may be each a multi-start thread. Using multi-start threads for both the internal thread 68*c* and the external thread 72*c* can increase the lead without increasing the pitch.

The valve opening spring 77 is disposed between the valve-member supporting member 25 and the flange 43*b* of the valve member 40. The valve opening spring 77 is a compression coil spring. The valve opening spring 77 pushes the valve member 40 upward (in a direction away from the valve port 14).

The stator unit 80 includes a case 81, a stator 82, and a circuit board 83. The case 81 is made of synthetic resin. The case 81 has a box shape. The case 81 houses the stator 82 and the circuit board 83. The stator 82 and the circuit board 83 are secured to the case 81 by screws.

The stator 82 has a circular cylindrical shape. The can 30 is disposed in the stator 82. The stator 82 and the rotor 51 are members of a stepping motor 88. The motor-operated valve 1 may include a motor of another type instead of the stepping motor 88.

Electronic components including an angle sensor 84 are mounted on the circuit board 83. The angle sensor 84 is a magnetic angle sensor. The angle sensor 84 is mounted on the lower surface of the circuit board 83. The angle sensor 84 is disposed above the can 30. The angle sensor 84 faces the permanent magnet 55 in the up-and-down direction with the can 30 in between. The angle sensor 84 detects the direction and the magnitude of the magnetic field passing through the angle sensor 84. The rotational angle of the permanent magnet 55 can be obtained on the basis of an electric signal output by the angle sensor 84.

In the motor-operated valve 1, the respective central axes of the valve port 14, the holder 20, the valve-member supporting member 25 (the supporting hole 26), the can 30, the valve member 40, the rotor 51, the coupling plate 52, the rotor shaft 53, the permanent magnet 55, the output shaft 67, the guide member 68, the driving shaft 70, the ball 76, and the stator 82 are aligned with the axis M.

The operation of the motor-operated valve 1 is described below.

In the motor-operated valve 1, currents are supplied to the stator 82 to rotate the rotor 51 in the first direction. The rotational speed of the rotor 51 is reduced in the planetary gear mechanism 60, and the rotation of the rotor 51 is transmitted to the driving shaft 70. When the driving shaft 70 rotates, a screw-feed action of the external thread 72*c* of the driving shaft 70 and the internal thread 68*c* of the guide member 68 moves the driving shaft 70 downward and toward the valve port 14. The driving shaft 70 pushes the valve member 40 downward. The valve member 40 moves downward, decreasing the opening area of the valve port 14. When the valve member 40 comes into contact with the valve seat 15 to close the valve port 14, the motor-operated valve 1 enters the fully closed state.

In the motor-operated valve 1, currents are supplied to the stator 82 to rotate the rotor 51 in the second direction. The rotational speed of the rotor 51 is reduced in the planetary gear mechanism 60, and the rotation of the rotor 51 is transmitted to the driving shaft 70. When the driving shaft 70 rotates, the screw-feed action of the external thread 72*c* of the driving shaft 70 and the internal thread 68*c* of the guide member 68 moves the driving shaft 70 upward and away from the valve port 14. The valve opening spring 77 pushes the valve member 40 upward. The valve member 40 moves upward, increasing the opening area of the valve port 14. When the valve member 40 is positioned farthest from the valve port 14, the motor-operated valve 1 enters a fully open state. When the motor-operated valve 1 is in the fully open state, the opening area of the valve port 14 is at the maximum value.

A switching time and an axial force are examined below. The switching time is the time for the motor-operated valve 1 to switch from the fully open state to the fully closed state (or from the fully closed state to the fully open state). The axial force is the force exerted by the driving shaft 70 to move the valve member 40.

In the motor-operated valve 1, where Z represents the movement amount of the valve member 40 from the fully open state to the fully closed state, N represents the number of poles of a stepping motor, V represents the pulse rate of the pulse signal for the stepping motor, y represents an excitation method (micro step resolution) of the stepping motor, K represents the speed-reduction ratio of the planetary gear mechanism 60, and L represents the lead of the external thread 72*c* of the driving shaft 70, a switching time T is given by the following expression (a).

$$T=\{(Z\times N)/(\gamma\times V)\}\times(K/L) \quad \text{(a)}$$

Additionally, in the motor-operated valve 1, the axial force relates to torque input to the driving shaft 70 and the lead angle of the external thread 72*c*. The torque relates to the speed-reduction ratio K, and the lead angle relates to the lead L. The micro step resolution is 1 in full-step method and ½ in half-step method.

Therefore, each of the switching time and the axial force relate to the speed-reduction ratio K and the lead L.

The inventors used multiple motor-operated valves 1, each with a unique speed-reduction ratio K of the planetary gear mechanism 60 and lead L of the external thread 72*c* of the driving shaft 70, to measure switching times and axial forces. FIG. 3 shows the measurement results. As the external thread 72*c* is the single-start thread, the lead is equal to the pitch.

FIG. 3 is a graph illustrating the relationship between the switching time and the axial force. The unit of the switching time is "second(s)", and the unit of the axial force is "newton (N)".

Point a1 corresponds to the measurement values in the motor-operated valve 1 where the speed-reduction ratio K is 30 and the lead L of the external thread 72*c* is equal to 0.12K.

Point a2 corresponds to the measurement values in the motor-operated valve 1 where the speed-reduction ratio K is 30 and the lead L of the external thread 72*c* is equal to 0.10K.

Point a3 corresponds to the measurement values in the motor-operated valve 1 where the speed-reduction ratio K is 30 and the lead L of the external thread 72*c* is equal to 0.067K.

Point a4 corresponds to the measurement values in the motor-operated valve 1 where the speed-reduction ratio K is 30 and the lead L of the external thread 72*c* is equal to 0.05K.

Point a5 corresponds to the measurement values in the motor-operated valve 1 where the speed-reduction ratio K is 30 and the lead L of the external thread 72*c* is equal to 0.04K.

Point a6 corresponds to the measurement values in the motor-operated valve 1 where the speed-reduction ratio K is 30 and the lead L of the external thread 72*c* is equal to 0.03K.

Line K30 passes through points a1 to a6 and represents the relationship between the switching time and the axial force in the motor-operated valve 1 where the lead L varies while the speed-reduction ratio K remains 30.

Point b1 corresponds to the measurement values in the motor-operated valve 1 where the speed-reduction ratio K is 100 and the lead L of the external thread 72*c* is equal to 0.12K.

Point b2 corresponds to the measurement values in the motor-operated valve 1 where the speed-reduction ratio K is 100 and the lead L of the external thread 72*c* is equal to 0.10K.

Point b3 corresponds to the measurement values in the motor-operated valve 1 where the speed-reduction ratio K is 100 and the lead L of the external thread 72*c* is equal to 0.067K.

Point b4 corresponds to the measurement values in the motor-operated valve 1 where the speed-reduction ratio K is 100 and the lead L of the external thread 72*c* is equal to 0.05K.

Point b5 corresponds to the measurement values in the motor-operated valve 1 where the speed-reduction ratio K is 100 and the lead L of the external thread 72*c* is equal to 0.04K.

Point b6 corresponds to the measurement values in the motor-operated valve 1 where the speed-reduction ratio K is 100 and the lead L of the external thread 72*c* is equal to 0.03K.

Line K100 passes through points b1 to b6 and represents the relationship between the switching time and the axial force in the motor-operated valve 1 where the lead L varies while the speed-reduction ratio K remains 100.

The automotive air conditioner is required to switch operation modes more quickly. Thus, the motor-operated valve 1 is required to reduce the switching time while ensuring the necessary axial force. In FIG. 3, line D1 corresponds to the switching time of 8 seconds, and line D2 corresponds to the lower limit value (140 newtons) of the axial force. The motor-operated valve 1, with the measurement values (points a2 to a5, points b1 to b5) located in the area shown in FIG. 3 on the left side of line D1 and above line D2, can achieve a shorter switching time while ensuring the necessary axial force.

Consequently, satisfying the following expressions (1) and (2) allows the motor-operated valve 1 to achieve a shorter switching time while ensuring the necessary axial force.

$$0.04\mathrm{K} \leq L \leq 0.10\mathrm{K} \tag{1}$$

$$30 \leq \mathrm{K} \leq 100 \tag{2}$$

Preferably, the motor-operated valve 1 satisfies the following expressions (1A) and (2). In FIG. 3, line D3 corresponds to the switching time of 5 seconds. The motor-operated valve 1, with the measurement values (points a2 and a3, points b1 to b3) located in the area shown in FIG. 3 on the left side of line D3 and above line D2, can achieve an even shorter switching time while ensuring the necessary axial force.

$$0.067\mathrm{K} \leq L \leq 0.10\mathrm{K} \tag{1A}$$

$$30 \leq K \leq 100 \tag{2}$$

FIG. 4 illustrates a graph representing the relationship between the major diameter of the external thread 72*c* of the driving shaft 70 and the pitch of the external thread 72*c* of the driving shaft 70. The unit of the major diameter is "mm", and the unit of the pitch is "mm".

The major diameter of the external thread 72*c* (basic major diameter of the external thread: JIS B0205-4) is represented by d, the minor diameter of the external thread 72*c* (basic minor diameter of the external thread: JIS B0205-4) is represented by d1, the pitch of the external thread 72*c* is represented by p, and the fundamental triangle height of the external thread 72*c* is represented by H.

The relationship between the fundamental triangle height H and the pitch p and the relationship between the fundamental triangle height H, the major diameter d, and the minor diameter d1 are expressed by the following expressions (i) and (ii), respectively.

$$H = (\sqrt{3} \times p)/2 \tag{i}$$

$$d1 = d - 2 \times (5/8) \times H \tag{ii}$$

The following expression (iii) for the pitch p is obtained from these expressions.

$$p = \{8 \times (d - d1)\}/(5 \times \sqrt{3}) \tag{iii}$$

Increasing the pitch p of the external thread 72*c* of the driving shaft 70 decreases the minor diameter d1, thereby reducing the rigidity of the driving shaft 70. To ensure the necessary rigidity of the driving shaft 70, the minor diameter d1 is defined by the following expressions (iv) and (v), informed by past experience.

$$d1 \geq 2.5 \text{ for } d \leq 35/8 \tag{iv}$$

-continued $$d/d1 \leq 1.75 \text{ for } d \geq 35/8 \quad \text{(v)}$$

The following expression (3) is obtained from expressions (iii) and (iv).

$$p \leq \{4 \times (2 \times d - 5)\}/(5\sqrt{3}) \text{ for } d \leq 35/8 \quad (3)$$

The following expression (4) is obtained from expressions (iii) and (v).

$$p \leq (24 \times d)/(35 \times \sqrt{3}) \text{ for } d \geq 35/8 \quad (4)$$

In FIG. 4, line J3 corresponds to expression (3), line J4 corresponds to expression (4), and line D4 corresponds to the major diameter of 35/8 (4.375) mm. The driving shaft 70 can ensure the necessary rigidity by setting the pitch p to a value at or below line J3 when the major diameter of the external thread 72*c* is less than or equal to 35/8 mm, and to a value at or below line J4 when the major diameter of the external thread 72*c* is greater than or equal to 35/8 mm.

As described above, the motor-operated valve 1 includes the valve body 10 that has the valve port 14, the valve member 40 that faces the valve port 14, the stepping motor 88 that includes the rotor 51, the driving shaft 70 that has the external thread 72*c*, the guide member 68 that has the internal thread 68*c* into which the external thread 72*c* is screwed, and the planetary gear mechanism 60 that reduces the rotational speed of the rotor 51 and transmits the rotation of the rotor 51 to the driving shaft 70. When the driving shaft 70 rotates, the driving shaft 70 moves toward or away from the valve port 14 to move the valve member 40 with respect to the valve port 14. Where L represents the lead of the external thread 72*c*, and K represents the speed-reduction ratio of the planetary gear mechanism 60, expressions (1) and (2) above are satisfied. With this configuration, the motor-operated valve 1 can achieve a shorter switching time for the motor-operated valve 1 to switch states while ensuring the necessary axial force.

Where d represents the major diameter of the external thread 72*c*, d1 represents the minor diameter of the external thread 72*c*, and p represents the pitch of the external thread 72*c*, expressions (3) and (4) above are satisfied. With this configuration, the driving shaft 70 can ensure the necessary rigidity.

In this specification, the terms indicating shapes, such as "circular cylindrical", "circular columnar", and "rectangular parallelepiped", are also used for members and portions of the members substantially having the shapes indicated by the terms. For example, "circular cylindrical member" includes a circular cylindrical member and a substantially circular cylindrical member.

The embodiment of the present invention is described above. The present invention, however, is not limited to the embodiment. Embodiments obtained by a person skilled in the art appropriately adding, removing, or modifying components according to the embodiment described above, and an embodiment obtained by appropriately combining features of the embodiment are included in the scope of the present invention without departing from the spirit of the present invention.

REFERENCE SIGNS LIST

1 . . . motor-operated valve, 10 . . . valve body, 10*a* . . . right surface, 10*b* . . . left surface, 10*c* . . . upper surface, 13 . . . valve chamber, 14 . . . valve port, 15 . . . valve seat, 17 . . . first passage, 18 . . . second passage, 19 . . . mounting hole, 19*a* . . . annular flat surface, 20 . . . holder, 20*a* . . . upper part, 25 . . . valve-member supporting member, 25*a* annular flat surface, 26 . . . supporting hole, 30 . . . can, 35 . . . connection member, 40 . . . valve member, 41 . . . stem, 42 . . . valve portion, 43 . . . spring receiving portion, 43*a* . . . body, 43*a*1 . . . first hole, 43*a*2 . . . second hole, 43*b* . . . flange, 44 . . . ball receiving portion, 44*a* . . . flat plate, 44*b* . . . projection, 50 . . . driving mechanism, 51 . . . rotor, 52 . . . coupling plate, 53 . . . rotor shaft, 55 . . . permanent magnet, 56 . . . magnetic shielding member, 60 planetary gear mechanism, 61 . . . gear case, 62 . . . fixed ring gear, 63 . . . sun gear, 64 . . . planetary gear, 65 . . . carrier, 66 . . . output gear, 67 . . . output shaft, 67*a* . . . slit, 68 . . . guide member, 68*c* . . . internal thread, 70 . . . driving shaft, 71 . . . first portion, 72 . . . second portion, 72*c* . . . external thread, 76 . . . ball, 77 . . . valve opening spring, 80 . . . stator unit, 81 . . . case, 82 . . . stator, 83 . . . circuit board, 84 . . . angle sensor, 88 . . . stepping motor, M . . . axis.

The invention claimed is:

1. A motor-operated valve comprising: a valve body that has a valve port; a valve member that faces the valve port; a motor that includes a rotor; a driving shaft that has an external thread; a guide member that has an internal thread into which the external thread is screwed; and a gear mechanism that reduces rotational speed of the rotor and transmits rotation of the rotor to the driving shaft, wherein when the driving shaft rotates, the driving shaft moves toward or away from the valve port to move the valve member with respect to the valve port, and wherein where L represents a lead of the external thread, K represents a speed-reduction ratio of the gear mechanism, d represents a major diameter of the external thread, and p represents a pitch of the external thread, expressions (1), (2), (3), and (4) below are satisfied:

$$0.04K \leq L \leq 0.10K \quad (1)$$

$$30 \leq K \leq 100 \quad (2)$$

$$p \leq \{4 \times (2 \times d - 5)\}/(5 \times \sqrt{3}) \text{ for } d \leq 35/8 \quad (3)$$

$$p \leq (24 \times d)/(35 \times \sqrt{3}) \text{ for } d \geq 35/8. \quad (4)$$

2. The motor-operated valve according to claim 1, wherein the external thread and the internal thread are each a multi-start thread.

3. The motor-operated valve according to claim 1, wherein expression (2A) below is further satisfied:

$$K=30. \quad \text{(2A)}$$

4. The motor-operated valve according to claim 1, wherein expressions (1A) and (a2) below are further satisfied:

$$0.067K \le L \le 0.10K \quad (1A)$$

$$\{(Z \times N)/(y \times V)\} \times (K/L) < 5. \quad (a2)$$

5. A motor-operated valve comprising: a valve body that has a valve port; a valve member that faces the valve port; a motor that includes a rotor; a driving shaft that has an external thread; a guide member that has an internal thread into which the external thread is screwed; and a gear mechanism that reduces rotational speed of the rotor and transmits rotation of the rotor to the driving shaft, wherein when the driving shaft rotates, the driving shaft moves toward or away from the valve port to move the valve member with respect to the valve port, wherein where L represents a lead of the external thread, and K represents a speed-reduction ratio of the gear mechanism, expressions (1) and (2) below are satisfied:

$$0.04K \le L \le 0.10K \quad (1)$$

$$30 \le K \le 100, \quad (2)$$

wherein the motor is a stepping motor, and wherein where Z represents a movement amount of the valve member from a fully open state in which the valve member is positioned furthest from the valve port to a fully closed state in which the valve port is closed, N represents the number of poles of the stepping motor, V represents a pulse rate of a pulse signal for the stepping motor, and y represents a micro step resolution for an excitation method of the stepping motor, expression (a1) below is further satisfied:

$$\{(Z \times N)/(y \times V)\} \times (K/L) < 8. \quad (a1)$$

6. The motor-operated valve according to claim 5, wherein where d represents a major diameter of the external thread, and p represents a pitch of the external thread, expressions (3) and (4) below are satisfied:

$$p \le \{4 \times (2 \times d - 5)\}/(5 \times \sqrt{3}) \text{ for } d \le 35/8 \quad (3)$$

$$p \le (24 \times d)/(35 \times \sqrt{3}) \text{ for } d \ge 35/8. \quad (4)$$

7. The motor-operated valve according to claim 6, wherein expressions (1A) and (a2) below are further satisfied:

$$0.067K \le L \le 0.10K \quad (1A)$$

$$\{(Z \times N)/(y \times V)\} \times (K/L) < 5. \quad (a2)$$

8. The motor-operated valve according to claim 5, wherein the external thread and the internal thread are each a multi-start thread.

9. The motor-operated valve according to claim 5, wherein expression (2A) below is further satisfied:

$$K=30. \quad (2A)$$

* * * * *